United States Patent
Bergljung et al.

(10) Patent No.: US 12,425,975 B2
(45) Date of Patent: Sep. 23, 2025

(54) EXTENDED POWER CLASS FOR UPLINK (UL) MULTIPLE-INPUT MULTIPLE-OUTPUT (MIMO) COMMUNICATIONS

(71) Applicant: Telefonaktiebolaget LM Ericsson (publ), Stockholm (SE)

(72) Inventors: Christian Bergljung, Lund (SE); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 498 days.

(21) Appl. No.: 17/799,883

(22) PCT Filed: Feb. 15, 2021

(86) PCT No.: PCT/IB2021/051271
§ 371 (c)(1),
(2) Date: Aug. 15, 2022

(87) PCT Pub. No.: WO2021/161289
PCT Pub. Date: Aug. 19, 2021

(65) Prior Publication Data
US 2023/0107064 A1    Apr. 6, 2023

Related U.S. Application Data

(60) Provisional application No. 62/976,797, filed on Feb. 14, 2020.

(51) Int. Cl.
*H04W 52/14* (2009.01)
*H04W 52/36* (2009.01)

(52) U.S. Cl.
CPC ....... *H04W 52/146* (2013.01); *H04W 52/365* (2013.01); *H04W 52/367* (2013.01)

(58) Field of Classification Search
CPC ... H04W 52/14; H04W 52/36; H04W 52/146; H04W 52/365; H04W 52/367; H04L 1/0026; H04L 1/0029
See application file for complete search history.

(56) References Cited

U.S. PATENT DOCUMENTS

10,439,847 B2 * 10/2019 Park ................... H04L 5/0051
10,476,567 B2 * 11/2019 Wernersson ......... H04B 7/0626
(Continued)

FOREIGN PATENT DOCUMENTS

WO    WO-2019158461 A1 *    8/2019    ............ H04W 52/34

OTHER PUBLICATIONS

VIVO, "Further discussion on full Tx power in UL transmission", 3GPP TSG RAN WG1 #96bis, R1-1904098, Xi'an, China, Apr. 8-12, 2019.

*Primary Examiner* — Hai V Nguyen
(74) *Attorney, Agent, or Firm* — Sage Patent Group

(57) ABSTRACT

An extended power class for Uplink (UL) Multiple Input Multiple Output (MIMO) communications is provided. In this regard, a User Equipment (UE) configured to UL MIMO can indicate support for a first power class corresponding to a first power level. The UE can transmit a single layer Physical UL Shared Channel (PUSCH) on one antenna port at a power that is at most a first power level corresponding to the first power class. The UE can also transmit an N-layer PUSCH on N antenna ports at a second power level greater than the first power level. With the extended power class, UEs are able to deliver higher power signals without increasing the maximum power of their Power Amplifiers (PAs). This greater power can lead to better user experience, less battery drain, and higher network capacity.

18 Claims, 9 Drawing Sheets

(56) References Cited

U.S. PATENT DOCUMENTS

| | | | | |
|---|---|---|---|---|
| 10,708,088 B2* | 7/2020 | Park | ...................... | H04W 72/04 |
| 10,952,151 B2* | 3/2021 | Rahman | .............. | H04W 52/362 |
| 11,303,339 B2* | 4/2022 | Park | ...................... | H04B 7/0628 |
| 11,503,552 B2* | 11/2022 | Bergström | ........... | H04W 52/367 |
| 11,533,688 B2* | 12/2022 | Abdel Shahid | ..... | H04W 52/267 |
| 11,632,155 B2* | 4/2023 | Park | ...................... | H04B 7/0404 |
| | | | | 370/329 |
| 11,638,219 B2* | 4/2023 | Park | ....................... | H04B 7/088 |
| | | | | 370/329 |
| 11,641,255 B2* | 5/2023 | Dinan | .................. | H04L 1/1812 |
| | | | | 370/329 |
| 11,647,467 B2* | 5/2023 | Rahman | ................ | H04W 52/42 |
| | | | | 370/329 |
| 11,706,718 B2* | 7/2023 | Rahman | .............. | H04W 52/362 |
| | | | | 370/328 |
| 11,736,171 B2* | 8/2023 | Park | ...................... | H04B 7/0695 |
| | | | | 370/329 |
| 11,805,529 B2* | 10/2023 | Park | ...................... | H04W 52/42 |
| 11,843,432 B2* | 12/2023 | Park | ...................... | H04W 72/23 |
| 11,856,530 B2* | 12/2023 | Lee | ...................... | H04W 52/58 |
| 11,888,558 B2* | 1/2024 | Park | ...................... | H04B 7/0695 |
| 11,889,430 B2* | 1/2024 | Abdel Shahid | .... | H04B 17/3913 |
| 11,917,647 B2* | 2/2024 | Park | ...................... | H04W 52/42 |
| 12,010,630 B2* | 6/2024 | Park | ...................... | H04W 52/146 |
| 12,101,180 B2* | 9/2024 | Ioffe | ...................... | H04L 5/1469 |
| 12,101,763 B2* | 9/2024 | Islam | .................... | H04W 72/23 |
| 12,143,977 B2* | 11/2024 | Go | ...................... | H04W 52/367 |
| 2011/0199985 A1* | 8/2011 | Cai | ....................... | H04L 1/0009 |
| | | | | 370/329 |
| 2013/0163534 A1* | 6/2013 | Anderson | ......... | H04W 72/0446 |
| | | | | 370/329 |
| 2018/0070363 A1* | 3/2018 | Chakraborty | ........ | H04B 17/318 |
| 2019/0149305 A1* | 5/2019 | Zhou | ..................... | H04L 5/0092 |
| | | | | 370/330 |
| 2019/0190747 A1* | 6/2019 | Park | ...................... | H04L 5/0057 |
| 2019/0199554 A1* | 6/2019 | Park | ...................... | H04L 25/0226 |
| 2019/0208436 A1* | 7/2019 | Zhou | ..................... | H04L 1/0009 |
| 2019/0215136 A1* | 7/2019 | Zhou | ..................... | H04L 1/1819 |
| 2019/0281588 A1* | 9/2019 | Zhang | .................. | H04W 52/08 |
| 2019/0312617 A1* | 10/2019 | Wernersson | ......... | H04B 7/0486 |
| 2019/0349866 A1* | 11/2019 | Lin | ..................... | H04W 52/365 |
| 2019/0372806 A1* | 12/2019 | Park | ...................... | H04W 72/23 |
| 2019/0386771 A1* | 12/2019 | Liu | ...................... | H04B 7/0456 |
| 2019/0387409 A1* | 12/2019 | Thangarasa | ........... | H04W 16/00 |
| 2020/0154364 A1* | 5/2020 | Rahman | ............... | H04B 7/0404 |
| 2020/0213067 A1* | 7/2020 | Cirik | .................... | H04L 5/0051 |
| 2020/0229104 A1* | 7/2020 | MolavianJazi | ....... | H04W 52/54 |
| 2020/0266867 A1* | 8/2020 | Park | ...................... | H04L 1/0681 |
| 2021/0022091 A1* | 1/2021 | Li | ........................ | H04W 52/242 |
| 2021/0092690 A1* | 3/2021 | Bergström | ............ | H04W 52/34 |
| 2021/0144655 A1* | 5/2021 | Li | ........................ | H04W 52/383 |
| 2021/0282143 A1* | 9/2021 | Lee | ..................... | H04W 52/343 |
| 2022/0046556 A1* | 2/2022 | Lee | ..................... | H04W 52/365 |
| 2022/0070855 A1* | 3/2022 | Zhang | .................. | H04W 72/51 |
| 2022/0166480 A1* | 5/2022 | Park | ...................... | H04B 7/0695 |
| 2022/0167279 A1* | 5/2022 | Zhou | ..................... | H04W 52/146 |
| 2022/0167335 A1* | 5/2022 | Go | ....................... | H04W 52/146 |
| 2022/0190892 A1* | 6/2022 | Park | ........................ | H04L 27/26 |
| 2022/0191065 A1* | 6/2022 | Park | ...................... | H04B 7/0486 |
| 2022/0393738 A1* | 12/2022 | Park | ...................... | H04W 52/50 |
| 2023/0023719 A1* | 1/2023 | Ji | ........................... | H04W 16/28 |
| 2023/0061726 A1* | 3/2023 | Jung | ....................... | H04L 5/0094 |
| 2023/0084239 A1* | 3/2023 | Cha | ..................... | H04W 52/241 |
| | | | | 455/522 |
| 2023/0094321 A1* | 3/2023 | Okamura | .............. | H04W 52/42 |
| | | | | 375/267 |
| 2023/0142830 A1* | 5/2023 | Myung | ................. | H04L 5/0064 |
| | | | | 370/329 |

* cited by examiner

EXTENDED POWER CLASS FOR UPLINK (UL) MULTIPLE-INPUT MULTIPLE-OUTPUT (MIMO) COMMUNICATIONS

RELATED APPLICATIONS

This application is a national phase application of International Patent Application No. PCT/IB2021/051271, filed Feb. 15, 2021, which claims the benefit of U.S. Provisional Patent Application No. 62/976,797, filed Feb. 14, 2020, the disclosures of which are hereby incorporated herein by reference in their entirety.

TECHNICAL FIELD

The present disclosure is related to power classes of wireless devices using Multiple-Input Multiple-Output (MIMO) communications.

BACKGROUND

The next generation mobile wireless communication system (5G) or New Radio (NR) supports a diverse set of use cases and a diverse set of deployment scenarios. NR includes deployment at both low frequencies (100 s of megahertz (MHz)), similar to Long Term Evolution (LTE) today, and very high frequencies (millimeter waves in the tens of gigahertz (GHz)).

Antenna Ports, Coherence, and Virtualization

When multi-antenna techniques are used, it is generally desirable to allow as much implementation freedom as possible so that different devices can be optimized for different use cases, form factors, construction cost, etc. Therefore, multi-antenna operation in NR and LTE is described in terms of antenna ports. An antenna port is defined such that the channel over which a symbol on the antenna port is conveyed can be inferred from the channel over which another symbol on the same antenna port is conveyed.

FIG. 1 is a schematic block diagram of a multi-antenna system for Radio Frequency (RF) communications. An antenna port for a transmitter in a multi-antenna system can be formed by transmitting the same reference signal on multiple transmit chains. In this case, the received signal at a receiver is a combination of the reference signal after it travels through each radio channel corresponding to each of the antennas of the transmit chains. This combined signal appears as though it were transmitted by a single antenna with combined, or 'effective', channel and is therefore described as a single 'virtual' antenna.

When transmitting on two antennas, there may be a difference in relative gain or phase. This is shown in FIG. 1 as the factor e, which can be expressed as a complex number $e=ge^{j\phi}$, where g is a positive real number representing gain and $\phi$ is a real number representing phase. The effective channel may then be given by: $h_c=h_1+eh_2$, where $h_1$ and $h_2$ are complex numbers identifying the channels to the first and second antennas, respectively. The channels $h_1$ and $h_2$ will vary according to the frequency on which they are measured in the presence of multipath, and therefore vary among resource elements of an LTE or NR signal. Similarly, e may vary across frequency, depending on the design of the transmit chains of the transmitter. Herein we describe channels as complex scalars, focusing on a single resource element for purposes of explanation.

If the factor e can be sufficiently well controlled, coherent transmission across the two transmit chains is said to be possible, and precoding or beamforming techniques can be used. Such techniques often set e to increase the received power of the effective channel, where the effective channel power may be described as $p_c=|h_c|^2$. Since coherent transmission allows greater received power, it is possible to use Power Amplifiers (PAs) with lower power capability than if a single antenna is used. For example, assuming that the magnitudes of the two channels to the two antennas are the same and e is selected such that received signal from the second antenna is in phase with the first, then the power is 4 times higher than if the transmission were only on the first antenna, that is: $|h_1+eh_2|^2/|h_1|^2=|2h_1|^2/|h_1|^2=4$. Therefore, it is possible to transmit on each transmit chain with half power when using coherent transmission, and still obtain two times more power than single antenna transmission.

If the factor e cannot be sufficiently well controlled, coherent transmission across the two transmit chains is not possible, but non-coherent transmission may be used instead. In this case, precoded transmissions on the two antennas do not necessarily provide a power gain, and instead may actually destructively combine to reduce the total power. The power in the effective channel is $|h_1+eh_2|^2=|h_1|^2-2\text{Re}(h_1^*eh_2)+|eh_2|^2$. If the term $2\text{Re}(h_1^*eh_2)=|h_1|^2+|h_2|^2$, then the received power is zero, while on the other hand if $-2\text{Re}(h_1^*eh_2)=|h_1|^2+|h_2|^2$, then the power is doubled. Assuming again that the power in each of the channels to the antennas is the same and that $|e|^2=1$, the power gain over single antenna transmission is $((2|h_1|^2-2\text{Re}\{h_1^*eh_2\}))/|h_1|^2$, which has a minimum value of 0 and a maximum value of 4. Assuming the channels are uncorrelated, the ratio of the average power of the combined power to that of the first antenna is $E\{(2|h_1|^2-2\text{Re}(h_1^*eh_2))/|h_1|^2\}=(2|h_1|^2)/|h_1|^2=2$. Therefore, if each antenna transmits at half power, and the channels are uncorrelated and equal power, the total power can be the same as when a single antenna is used. On the other hand, if the antennas are correlated, the power could be greater than or less than a single antenna, depending on the relative phase set by e. It can be observed then that some, but not all, User Equipment (UE) implementations can transmit on N transmit chains with N PAs whose maximum power rating is $P_{max}/N$, where $P_{max}$ is the total power needed from the UE and that would need to be transmitted on a single transmit chain. UE implementations such as those with correlated antennas (for example those with $\text{Re}\{h_1^*eh_2\}\neq 0$) that transmit on multiple transmit chains may produce less combined power than $P_{max}$ and so may require one or more of the PAs on its N transmit chains to have a maximum power rating greater than $P_{max}/N$.

Codebook-Based Precoding

Multi-antenna techniques can significantly increase the data rates and reliability of a wireless communication system. The performance is especially improved if both the transmitter and the receiver are equipped with multiple antennas, which results in a Multiple-Input Multiple-Output (MIMO) communication channel. Such systems and/or related techniques are commonly referred to as MIMO.

A core component in Release 15 NR is the support of MIMO antenna deployments and MIMO related techniques. NR supports Uplink (UL) MIMO with at most 4-layer spatial multiplexing using at most 4 antenna ports with channel dependent precoding. The spatial multiplexing mode is aimed for high data rates in favorable channel conditions.

FIG. 2 is a schematic block diagram of a transmission structure for a precoded spatial multiplexing operation in NR, where Cyclic Prefix Orthogonal Frequency Division Multiplexing (CP-OFDM) is used on the UL. An information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and is typically indicated by means of a Transmit Precoding Matrix Indicator (TPMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same Time/Frequency Resource Element (TFRE). The number of symbols r is typically adapted to suit the current channel properties.

The received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

One example method for a UE to select a precoder matrix W can be to select the $W_k$ that maximizes the Frobenius norm of the hypothesized equivalent channel:

$$\max_k \|\hat{H}_n W_k\|_F^2$$

where $\hat{H}_n$ is a channel estimate, possibly derived from a Sounding Reference Signal (SRS).

$W_k$ is a hypothesized precoder matrix with index k.

$\hat{H}_n W_k$ is the hypothesized equivalent channel.

In closed-loop precoding for the NR UL, a Transmission/Reception Point (TRP) transmits, based on channel measurements in the reverse link (e.g., UL), a TPMI to the UE that the UE should use on its UL antennas. The New Radio Base Station (gNB) configures the UE to transmit an SRS according to the number of UE antennas it would like the UE to use for UL transmission to enable the channel measurements. A single precoder that is supposed to cover a large bandwidth (wideband precoding) may be signaled.

Other information than TPMI is generally used to determine the UL MIMO transmission state, such as SRS Resource Indicators (SRIs) as well as Transmission Rank Indicators (TRIs). These parameters, as well as the Modulation and Coding Scheme (MCS), and the UL resources where Physical UL Shared Channel (PUSCH) is to be transmitted, are also determined by channel measurements derived from SRS transmissions from the UE. The transmission rank, and thus the number of spatially multiplexed layers, is reflected in the number of columns of the precoder W. For efficient performance, it is important that a transmission rank that matches the channel properties is selected.

UE Coherence Capability in NR

UE capabilities have been defined in Release 15 (Rel-15) NR for full coherence, partial coherence, and non-coherent transmission. These correspond to where all transmit chains, pairs of transmit chains, or none of the transmit chains have sufficiently well controlled relative phase for codebook based operation. Full coherence, partial coherence, and non-coherent UE capabilities are identified according to the terminology of Third Generation Partnership Project (3GPP) Technical Specification (TS) 38.331 version 15.0.1 as 'fullAndPartialAndNonCoherent', 'partialCoherent', and 'nonCoherent', respectively. This terminology is used because a UE supporting fully coherent transmission is also capable of supporting partial and non-coherent transmission and because a UE supporting partially coherent transmission is also capable of supporting non-coherent transmission. A UE can then be configured to transmit using a subset of the UL MIMO codebook that can be supported with its coherence capability. In 38.214 section 6.1.1, the UE can be configured with higher layer parameter ULCodebookSubset, which can have values 'fullAndPartialAndNonCoherent', 'partialAndNonCoherent', and 'nonCoherent', indicating that the UE uses subsets of a codebook that can be supported by UEs with fully coherent, partially coherent, and non-coherent transmit chains.

SRS Transmission in NR

SRSs are used for a variety of purposes in LTE, and are expected to serve even more purposes in NR. One primary use for SRS is for UL channel state estimation, allowing channel quality estimation to enable UL link adaptation (including determination of which MCS the UE should transmit with) and/or frequency-selective scheduling. In the context of UL MIMO, they can also be used to determine precoders and a number of layers that will provide good UL throughput and/or Signal Interference to Noise Ratio (SINR) when the UE uses them for transmission on its UL antenna array. Additional uses include power control, UL timing advance adjustment, beam management, and reciprocity-based Downlink (DL) precoding.

Unlike LTE Release 14 (Rel-14), at least some NR UEs may be capable of transmitting multiple SRS resources. This is similar conceptually to multiple Channel State Information Reference Signal (CSI-RS) resources on the DL: an SRS resource comprises one or more antenna ports, and the UE may apply a beamformer and/or a precoder to the antenna ports within the SRS resource such that they are transmitted with the same effective antenna pattern. A primary motivation for defining multiple SRS resources in the UE is to support analog beamforming in the UE where a UE can transmit with a variety of beam patterns, but only one at a time. Such analog beamforming may have relatively high directivity, especially at the higher frequencies that can be supported by NR.

In NR, the SRS sequence is a UE-specifically configured Zadoff-Chu based sequence and an SRS resource consists of 1 or 2 or 4 antenna ports. Another feature supported by NR is repetition of symbols within the resource with factor 1 or 2 or 4. This means that the transmission may be extended to multiple OFDM symbols which is intended for improving the UL coverage of the SRS. An SRS resource always spans 1 or 2 or 4 adjacent OFDM symbols and all ports are mapped to each symbol of the resource. SRS resources are mapped within the last 6 OFDM symbols of a UL slot. SRS resources are mapped on either every second or every fourth subcarrier, that is with so-called comb levels either 2 or 4. SRS resources are configured in SRS resource sets which contain one or multiple SRS resources.

UL Power Control

Setting output power levels of transmitters (base stations in DL and mobile stations in UL) in mobile systems is commonly referred to as Power Control (PC). Objectives of PC include improved capacity, coverage, improved system robustness, and reduced power consumption.

In LTE, PC mechanisms can be categorized into the groups (i) open-loop, (ii) closed-loop, and (iii) combined open- and closed-loop. These differ in what input is used to determine the transmit power. In the open-loop case, the transmitter measures some signal sent from the receiver, and sets its output power based on this. In the closed-loop case, the receiver measures the signal from the transmitter, and based on this sends a Transmit Power Control (TPC) command to the transmitter, which then sets its transmit power accordingly. In a combined open- and closed-loop scheme, both inputs are used to set the transmit power.

In systems with multiple channels between the terminals and the base stations, such as traffic and control channels, different power control principles may be applied to the different channels. Using different principles yields more freedom in adapting the power control principle to the needs of individual channels. The drawback is increased complexity of maintaining several principles.

Problems with Existing Solutions

There currently exist certain challenge(s). UEs are required to transmit at their rated power according to their declared power class, but may do so in a variety of ways. UEs may use sufficiently large PAs such that each transmit chain can deliver the full power, however this has the drawback of greater PA cost and/or higher UE battery drain rates. Alternatively, UEs can virtualize their antennas, as described above, where multiple transmit chains transmit a same PUSCH layer to form an antenna port. This virtualization allows UEs to combine the power of their transmit chains, enabling lower power PAs to be used. However, virtualization can be more or less difficult to use depending on how correlated or coupled the antennas in the transmit chains are, and how similar their antenna patterns are.

UEs can also deliver higher power by transmitting multiple PUSCH layers. This is generally simpler to do than virtualizing the antennas. The symbols on one PUSCH layer are independent of the symbols on the other layers, and so the relative phase between the transmit chains does not need to be controlled to avoid signal cancellation. This principle is exploited by non-coherent UE implementations, which only carry a given layer on one transmit chain. In such UEs, an N-layer transmission can have up to N times more power than a 1-layer transmission.

All NR UEs are required to transmit at their rated power of $P_{cmax}$ on one antenna port during initial access to the network, as well as when they are configured for single antenna port operation (such as when they are configured with a single SRS port for codebook based UL MIMO transmission). Non-coherent MIMO UEs that need to transmit multiple layers to reach their power class will not meet these single port power requirements. Therefore, such UEs should declare a lower power class value that they can achieve with a single antenna port. When these UEs transmit multiple layers, they will actually need to scale down their power, since UEs should not transmit a total power on all layers that is greater than their power class.

FIG. 3 is a block schematic diagram of an example non-coherent UE implementation of UL MIMO transmission. The UE has two 23 decibel-milliwatt (dBm) PAs, transmits a different SRS on each transmit chain, and can transmit a different PUSCH layer on each transmit chain. When the UE transmits on one antenna port, it will do so on one of the two transmit chains (as indicated by multiplying the output of the top transmit chain by 1 and the bottom transmit chain by 0). This means that it can transmit at most 23 dBm in single antenna port operation, and consequently should declare itself as a 23 dBm power class 3 UE according to the power classes in 3GPP TS 38.101 rev. 15.8.2. When the UE transmits two layers, it will transmit on both antennas, and so is capable of delivering 26 dBm for rank 2 operation. However, since it is limited to transmitting at most 23 dBm because it is a power class 3 UE, it will have to scale back its maximum transmit power, transmitting at most 20 dBm on each transmit chain. This 3 decibel (dB) backoff leads to less coverage of 2 layer transmission in a cell as well as less efficient PA operation.

3GPP TS 38.101-1 rev 15.8.2 sets the required maximum output power according to the amount of power transmitted on two layers, as described in the bolded portions of the excerpt reproduced below. The maximum output power is further required to be supported when the UE transmits on one antenna port in the underlined portions of the text. While the UE illustrated above can meet the 26 dBm power requirements for two layer transmission, it cannot do so for single antenna port operation. Consequently, the UE must either be able to virtualize its transmit chains or have at least one 26 dBm PA according to the present 38.101 specification.

6.2D.1 UE Maximum Output Power for UL MIMO

For power class 2 UE with two transmit antenna connectors in closed-loop spatial multiplexing scheme, the maximum output power for any transmission bandwidth within the channel bandwidth is specified in Table 6.2D.1-1. The requirements shall be met with the UL MIMO configurations specified in Table 6.2D.1-2. For UE supporting UL MIMO, the maximum output power is measured as the sum of the maximum output power at each UE antenna connector. The period of measurement shall be at least one sub frame (1 ms).

The requirements shall be met with the UL MIMO configurations of using 2-layer UL MIMO transmission with codebook of $$\frac{1}{\sqrt{2}}\begin{bmatrix} 1 & 0 \\ 0 & 1 \end{bmatrix}.$$

DCI Format for UE configured in PUSCH transmission mode for uplink single-user MIMO shall be used.

TABLE 6.2D.1-1

UE Power Class for UL MIMO in closed loop spatial multiplexing scheme

| NR band | Class 1 (dBm) | Tolerance (dB) | Class 2 (dBm) | Tolerance (dB) | Class 3 (dBm) | Tolerance (dB) | Class 4 (dBm) | Tolerance (dB) |
|---|---|---|---|---|---|---|---|---|
| n41 | | | 26 | +2/−3[1] | 23 | +2/−3[1] | | |
| n77 | | | 26 | +2/−3 | 23 | +2/−3 | | |
| n78 | | | 26 | +2/−3 | 23 | +2/−3 | | |
| n79 | | | 26 | +2/−3 | 23 | +2/−3 | | |

NOTE 1:
The transmission bandwidths confined within $F_{UL\_low}$ and $F_{UL\_low}$ + 4 MHz or $F_{UL\_high}$ − 4 MHz and $F_{UL\_high}$, the maximum output power requirement is relaxed by reducing the lower tolerance limit by 1.5 dB
NOTE 2:
Power class 3 is the default power class unless otherwise stated

TABLE 6.2D.1-2

UL MIMO configuration in closed-loop spatial multiplexing scheme

| Transmission scheme | DCI format | Codebook Index |
|---|---|---|
| Codebook based uplink | DCI format 0_1 | Codebook index 0 |

If UE is configured for transmission on single-antenna port, the requirements in clause 6.2.1 apply.

In summary, the prior art does not solve the problem for a non-coherent UL MIMO UE of allowing the UE to transmit full power on all its transmit chains while simultaneously meeting its power class power requirement during single port operation, where a non-coherent UL MIMO UE is defined as one that cannot virtualize its transmit chains to form a PUSCH layer.

SUMMARY

An extended power class for Uplink (UL) Multiple Input Multiple Output (MIMO) communications is provided. In this regard, a User Equipment (UE) configured to UL MIMO can indicate support for a first power class corresponding to a first power level. The UE can transmit a single layer Physical UL Shared Channel (PUSCH) on one antenna port at a power that is at most a first power level corresponding to the first power class. The UE can also transmit an N-layer PUSCH on N antenna ports at a second power level greater than the first power lev-el.

In some variations, a configured maximum output power corresponding to the first power class is multiplied by a factor of N, or equivalently increased by approximately 10 $\log_{10}(N)$ decibels (dB), to form the second power level. In some such variations, a Power Headroom Report (PHR) is calculated according to the second power level.

In some variations, the UE is configured to transmit one antenna port for the PUSCH.

In some variations, the UE is configured with N Sounding Reference Signal (SRS) ports and transmits the single layer PUSCH in response to DL Control Information (DCI) format 0_0, and the second power level is N times as large as the first power level.

In some variations, the UE indicates support for both the first power class and the ability to transmit at the second power level.

There are, proposed herein, various embodiments which address one or more of the issues disclosed herein. In some embodiments, a method performed by a wireless device for delivering increased transmission power is provided. The method includes transmitting first UL data to a network node over a single antenna port at or below a first power level corresponding to a first power class of the wireless device; and transmitting second UL data over a plurality of antenna ports at a second power level greater than the first power level.

In some embodiments, the method further comprises reporting support for the first power class to the network node prior to transmitting the first UL data.

In some embodiments, the first power class identifies the first power level as a maximum amount of transmission power for communication with the network node.

In some embodiments, the first UL data is transmitted over a single layer PUSCH.

In some embodiments, the second UL data is transmitted over an N-layer PUSCH via N antenna ports.

In some embodiments, the second power level is a function of a configured maximum output power corresponding to the first power class and N.

In some embodiments, the method further comprises reporting a power headroom calculated according to the second power level to the network node.

In some embodiments, the wireless device is configured with N SRS ports; and the second power level is N times the first power level.

In some embodiments, the first UL data is transmitted in response to being scheduled by DCI format 0_0.

In some embodiments, the second UL data is transmitted in response to being scheduled by DCI format 0_1.

In some embodiments, the second power level corresponds to a second power class.

In some embodiments, the method further comprises reporting support for the first power class and the second power class to the network node prior to transmitting the first UL data and prior to transmitting the second UL data.

In some embodiments, a method in a UE of delivering increased transmission power, wherein the UE can transmit on multiple antenna ports and at a second power level, is provided. The method includes indicating support for a first power class, wherein: the first power class corresponds to a first power level; the first power level is less than the second power level; and the first power class identifies a maximum amount of power a UE can transmit. The method further includes transmitting a single layer PUSCH on one antenna port at a power that is at most the first power level; and transmitting an N-layer PUSCH on N antenna ports at a second power that is at most the second power level, where N is at least 2.

In some embodiments, a configured maximum output power corresponding to the first power class is multiplied by a factor of N to form the second power level, and the method further comprises reporting a power headroom calculated according to the second power level.

In some embodiments, the UE is configured to transmit over one antenna port for PUSCH.

In some embodiments, the UE is configured with N SRS ports and transmits the single layer PUSCH in response to DCI format 0_0; and the second power level is N times as large as the first power level of the first power class.

In some embodiments, the method further comprises indicating support for both the first power class and the second power level.

In some embodiments, the second power level corresponds to a second power class.

In some embodiments, a wireless device for delivering increased transmission power is provided. The wireless device includes a plurality of antenna ports; and processing circuitry coupled to the plurality of antenna ports and configured to perform any of the steps of the above embodiments.

In some embodiments, a method performed by a network node for supporting an extended power class is provided. The method includes receiving an indication that a UE supports a first power class corresponding to a first power level; and scheduling the UE to transmit first UL data over a plurality of antenna ports at a second power level greater than the first power level.

In some embodiments, the first power class identifies the first power level as a maximum amount of transmission power for transmissions by the UE.

In some embodiments, the first UL data is scheduled for transmission over an N-layer PUSCH corresponding to N antenna ports of the UE.

In some embodiments, scheduling the UE to transmit the first UL data comprises scheduling the first UL data by DCI format 0_1.

In some embodiments, the method further comprises scheduling the UE to transmit second UL data over a single antenna port at or below the first power level.

In some embodiments, the second UL data is scheduled for transmission over a single layer PUSCH.

In some embodiments, scheduling the UE to transmit the second UL data comprises scheduling the second UL data by DCI format 0_0.

In some embodiments, the method further comprises receiving a Power Headroom Report (PHR) from the UE, wherein scheduling the UE to transmit the first UL data is based on the PHR.

In some embodiments, the method further comprises receiving another indication that the UE supports a second power class corresponding to the second power level.

In some embodiments, a network node for supporting an extended power class is provided. The network node comprises processing circuitry coupled to the plurality of antenna ports and configured to perform any of the above embodiments.

Certain embodiments may provide one or more of the following technical advantage(s). With the extended power class, UEs are able to deliver higher power signals without increasing the maximum power of their Power Amplifiers (PAs). This greater power can lead to better user experience, less battery drain, and higher network capacity.

In addition, there is less need for existing UEs that are capable of transmitting higher power than their power class to identify support for transmitting at the higher power level, which may limit the need for testing such UEs, and can allow more rapid introduction of the extended power class in networks.

Further, the power headroom can be correctly calculated even where the maximum output power varies.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
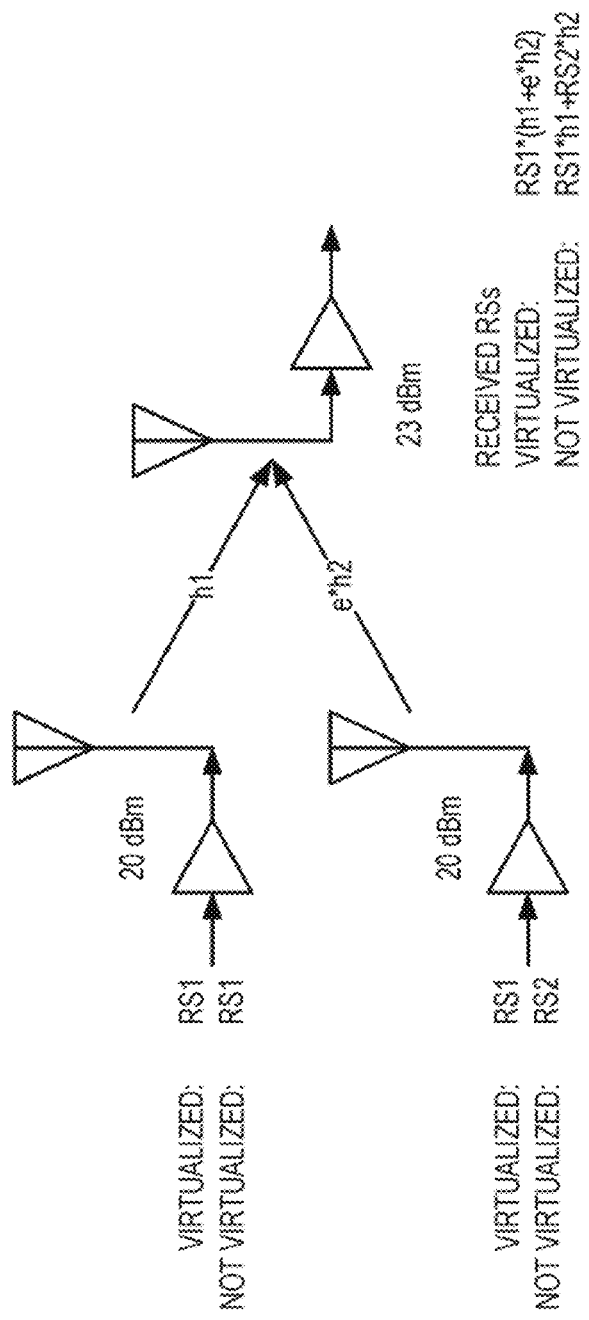
FIG. 1 is a schematic block diagram of a multi-antenna system for Radio Frequency (RF) communications.
Figure 2:
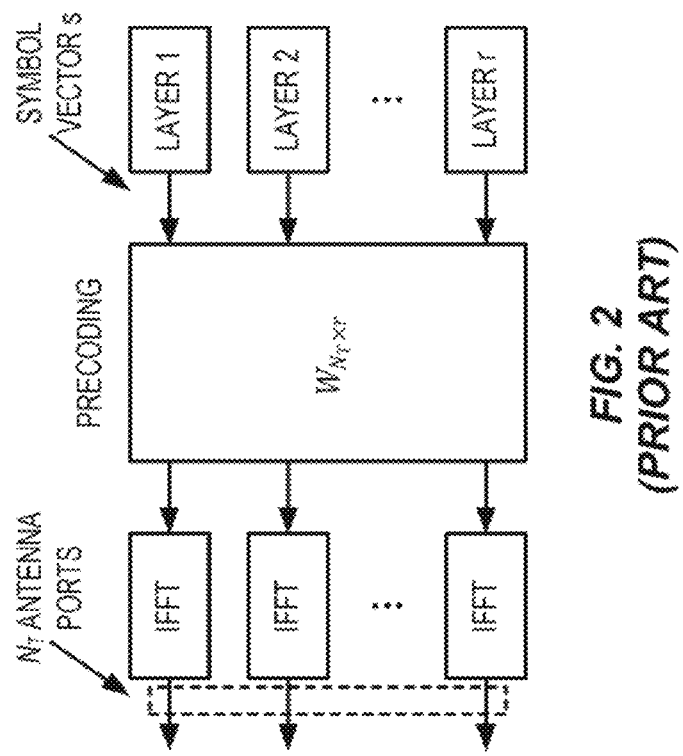
FIG. 2 is a schematic block diagram of a transmission structure for a precoded spatial multiplexing operation in New Radio (NR), where Cyclic Prefix Orthogonal Frequency Division Multiplexing (CP-OFDM) is used on the Uplink (UL).

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or personal computer. The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment (UE) device in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or personal computer. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 4:
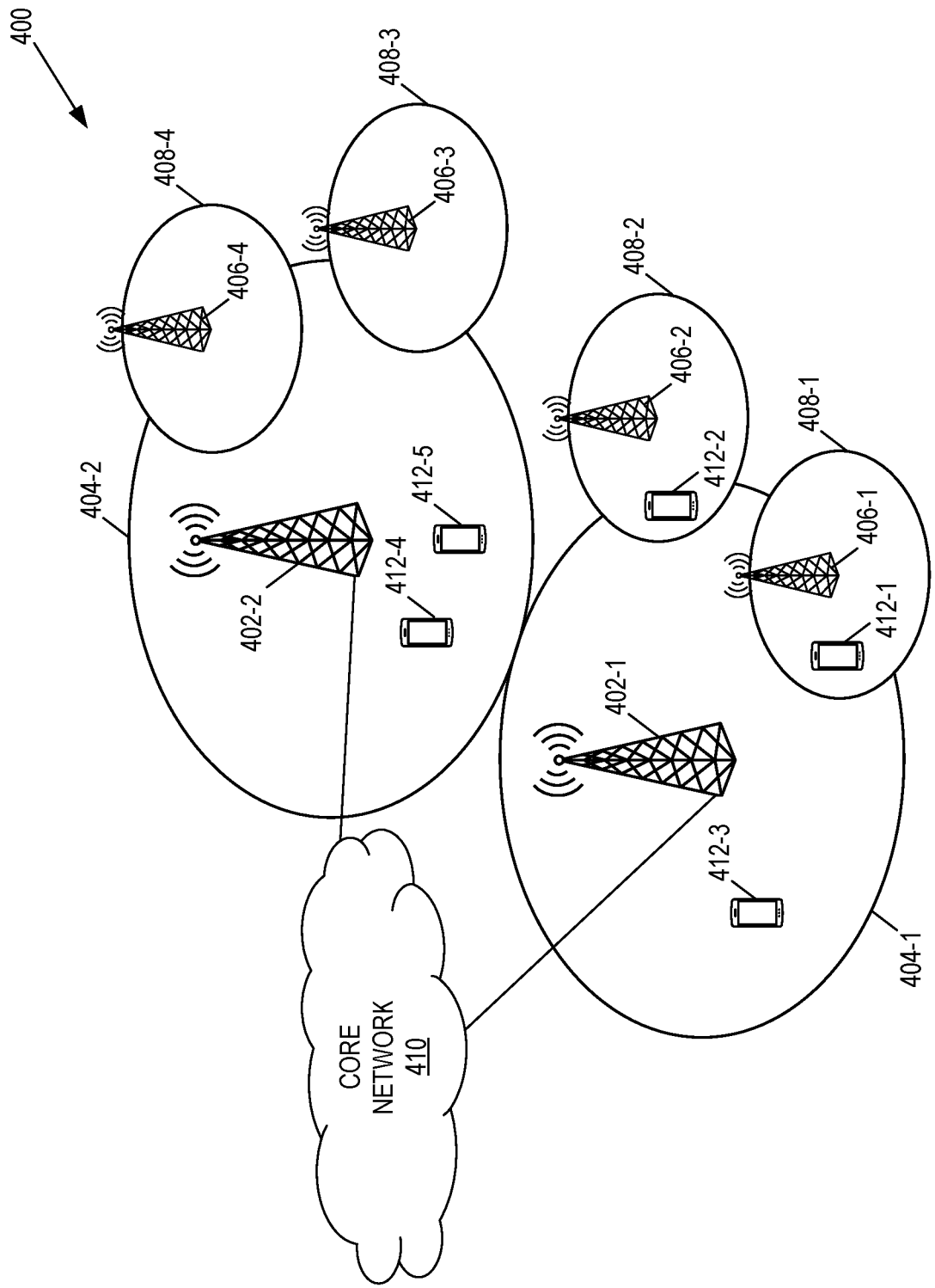
FIG. 4 illustrates one example of a cellular communications system in which embodiments of the present disclosure may be implemented.

FIG. 4 illustrates one example of a cellular communications system 400 in which embodiments of the present disclosure may be implemented. In the embodiments described herein, the cellular communications system 400 is a 5G system (5GS) including a NR RAN or LTE RAN (i.e., Evolved Universal Terrestrial Radio Access (E-UTRA) RAN). In this example, the RAN includes base stations 402-1 and 402-2, which in 5G NR are referred to as gNBs (e.g., LTE RAN nodes connected to 5G Core (5GC), which are referred to as gn-eNBs), controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5GS is referred to as the 5GC. The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

It is desirable to convey Uplink (UL) Multiple-Input Multiple-Output (MIMO) power transmission capability for a UE using a minimum amount of information while maximizing UE transmit chain and antenna implementation flexibility. In this regard, an extended power class for UL MIMO communications is provided. A UE configured to UL MIMO can indicate support for a first power class corresponding to a first power level. The UE can transmit a single layer Physical UL Shared Channel (PUSCH) on one antenna port at a power that is at most a first power level corresponding to the first power class. The UE can also transmit an N-layer PUSCH on N antenna ports at a second power level greater than the first power level.

A 3GPP Rel-15 UL MIMO UE transmits a maximum power according to the power classes defined in 3GPP Technical Specification (TS) 38.101 rev. 15.8.2 subclause 6.2D, as discussed above. Also, Rel-15 UEs declare one power class per band combination (as specified via the information element BandCombinationList in 3GPP TS 38.331 subclause 6.3.3). In order to allow the UE to transmit higher power than its power class, it is possible to use a power offset to increase the configured maximum output power. This is done in Rel-15, for example, to boost power for pi/2 Binary Phase Shift Keying (BPSK) operation, where a value of $\Delta P_{powerclass}=-3$ dB is used to increase the configured maximum output power $P_{CMAX,f,c}$. However, this boost is applied to all transmit chains the UE uses to transmit the PUSCH for one particular modulation scheme, and so does not solve the problem of power variation according to the number of transmitted MIMO layers. A solution instead can be to condition the power boost on the number of transmitted layers. A UE capable of transmitting up to N MIMO layers would transmit N times more power, or equivalently 10 log $_{10}$(N) dB more power, when transmitting N layers, and consequently its maximum configured transmit power would be 10 log $_{10}$(N) dB higher than its reported power class.

Because power headroom reporting (according to, e.g., 3GPP TS 38.213 subclause 7.7, resulting in a Power Headroom Report (PHR)) directly uses the value of the configured maximum output power $P_{CMAX,f,c}$, adjusting $P_{CMAX,f,c}$ according to the maximum number of layers the UE can transmit has the benefit that the PHR of the UE will be automatically adjusted for UEs that can increase their output power when transmitting multiple layers.

Because $P_{CMAX,f,c}$ and power headroom are calculated by the UE in the method above, there is less need to signal to the network that the UE is capable to transmit at a higher power level with a greater number of MIMO layers. Not indicating the capability to transmit at a higher power means that no new UE capability needs to be defined to support such UEs with extended power classes. This has the benefit that UEs already in the field capable of this behavior need not modify their capability reporting to support the behavior.

While UEs can report correct power headroom values without reporting their capability to transmit at a higher power value, there can be further benefits if the capability is defined and reported. If the network is aware of the capability, it can take into account that a non-coherent UE will transmit single layer PUSCH with N times less power than when it transmits the N layer PUSCH. In such cases, the network may choose to schedule the UE with more layers, since the throughput may be larger with N layers vs. 1 layer.

Figure 3:
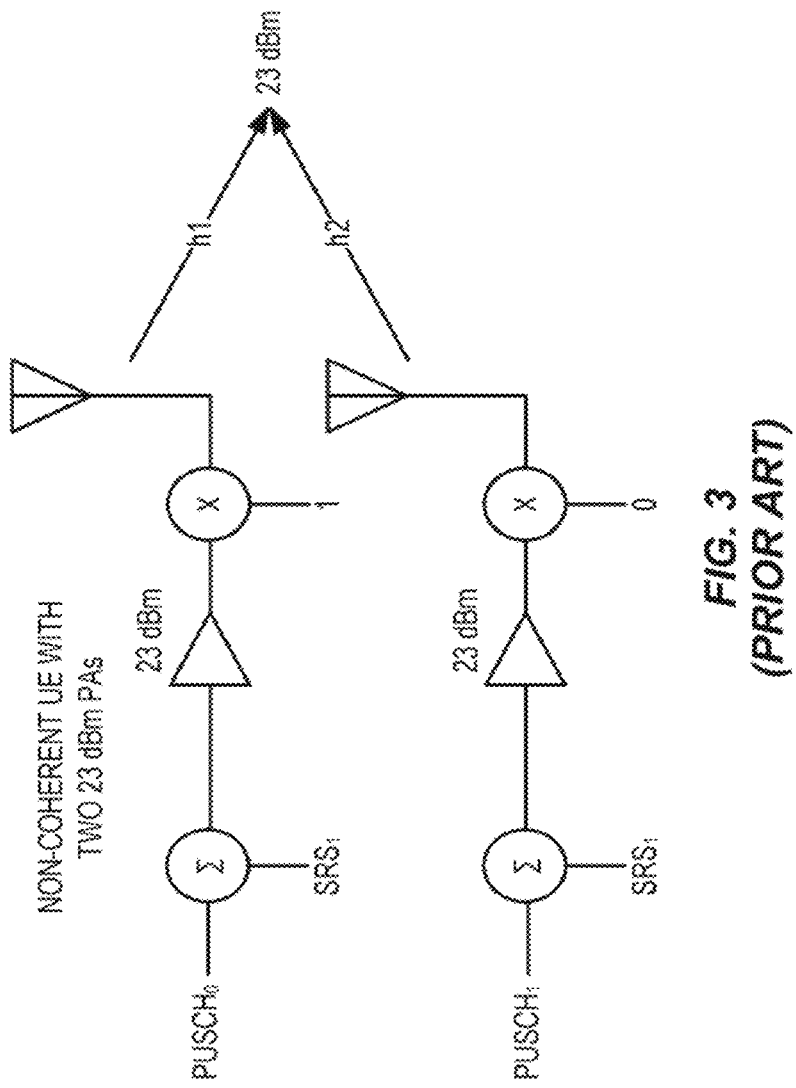
FIG. 3 is a block schematic diagram of an example non-coherent User Equipment (UE) implementation of UL Multiple-Input Multiple-Output (MIMO) transmission.

Embodiments described above are illustrated in the changes to 3GPP TS 38.101-1 rev 15.8.2 produced below. Struck out text is deleted and underlined text is added to rev 15.8.2 of the specification. A UE having Power Amplifier (PA) powers such as that illustrated in FIG. 3 that indicates power class 3 capability (of 23 dBm) but that is capable of transmitting at power class 2 capability (26 dBm) for two layer transmission uses a value of $\Delta P_{powerClass}$=−3 dB to offset its power according to 3GPP TS 38.101-1 rev 15.8.2 subclause 6.2.4, which uses the following:

$$P_{CMAX\_L,f,c} \leq P_{CMAX,f,c} \leq P_{CMAX\_H,f,c} \text{ with}$$

$$P_{CMAX\_L,f,c} = \text{MIN}\{P_{EMAX,c} - \Delta T_{C,c}, (P_{PowerClass} - \Delta P_{PowerClass}) - \text{MAX}(\text{MAX}(MPR_c, A\text{-}MPR_c) + \Delta T_{IB,c} + \Delta T_{C,c} + \Delta T_{RxSRS}, P\text{-}MPR_c)\}$$
$$P_{CMAX\_H,f,c} = \text{MIN}\{P_{EMAX,c}, P_{PowerClass} - \Delta P_{PowerClass}\}$$

Therefore, since the power corresponding to the power class $P_{PowerClass}$ is adjusted according to ($P_{PowerClass} - \Delta P_{PowerClass}$), $P_{CMAX,f,c}$ is 3 dB greater when the offset is used.

The revised 3GPP TS 38.101 text below also ensures that the UE transmits according to its power class when transmitting on one antenna port when DCI 0_0 is used and when it is configured for single antenna port operation when scheduled by DC 0_1.

Therefore, in a first embodiment, a UE capable of transmitting on multiple antenna ports indicates support for a first power class corresponding to a first power level. The UE is capable of transmitting at a second power level that is greater than the first power level. The UE transmits a single layer PUSCH on one antenna port at a power that is at most the first power level. The UE transmits an N layer PUSCH on N antenna ports at a power that is at most the second power level.

In some variations of the first embodiment, a configured maximum output power corresponding to the first power class is multiplied by a factor of N, or equivalently increased by approximately 10 log $_{10}$(N) dB, to form the second power level. In some such embodiments a PHR is calculated according to the second power level.

In some variations of the first embodiment, the UE is configured to transmit one antenna port for the PUSCH.

In some variations of the first embodiment, the UE is configured with N Sounding Reference Signal (SRS) ports and transmits the single layer PUSCH in response to DCI format 0_0, and the second power level is N times as large as the power for the first power class.

In some variations of the first embodiment, the UE indicates support for both the first power class and the ability to transmit at the second power level. In some such variations, the second power level corresponds to a second power class.

Changes to Clause 6.2D.1 of 3GPP TS 38.101, produced below, include:
1. Removing the ambiguity on applicability of the requirements when TPMI=0 is sent: Requirements for both single-layer and dual-layer transmission is specified with two ports configured.
2. Specifying the fall-back single-antenna port behavior: performance according to the power class capability indicated must be met when PUSCH is scheduled for single port transmission by DCI 0_0 (verified per connector).
3. Adding a requirement that full power according to the power class indicated shall be delivered when PUSCH is scheduled by DCI 0_1 and the UE is configured with a single antenna port following 3GPP TS 38.213.

6.2D Transmitter Power for UL MIMO
6.2D.1 UE Maximum Output Power for UL MIMO

For a UE with two transmit antenna connectors in closed-loop spatial multiplexing scheme, the maximum output power for any transmission bandwidth within the channel bandwidth is specified in Table 6.2D.1-1. The requirements shall be met with the UL MIMO configurations specified in Table 6.2D.1-2 with PUSCH scheduled by DCI format 0_1 and the transmission precoder selected from the codebooks for two antenna ports. For UEs indicating power class 3 in the ue-PowerClass field of the UE-NR-Capability IE, the UE shall meet the requirements 6.2D.1-1 for either power class 2 or power class 3. The maximum output power is measured as the sum of the maximum output powers from both UE antenna connectors. The period of measurement shall be at least one sub frame (1 ms).

$$\frac{1}{\sqrt{2}}\begin{bmatrix} 1 & 0 \\ 0 & 1 \end{bmatrix}$$

TABLE 6.2D.1-1

UE Power Class for UL MIMO in closed loop spatial multiplexing scheme

| NR band | Class 1 (dBm) | Tolerance (dB) | Class 2 (dBm) | Tolerance (dB) | Class 3 (dBm) | Tolerance (dB) | Class 4 (dBm) | Tolerance (dB) |
|---|---|---|---|---|---|---|---|---|
| n41 | | | 26 | +2/−3[1] | 23 | +2/−3[1] | | |
| n77 | | | 26 | +2/−3 | 23 | +2/−3 | | |
| n78 | | | 26 | +2/−3 | 23 | +2/−3 | | |
| n79 | | | 26 | +2/−3 | 23 | +2/−3 | | |

NOTE 1:
The transmission bandwidths confined within FUL_low and FUL_low + 4 MHz or FUL_high − 4 MHz and FUL_high, the maximum output power requirement is relaxed by reducing the lower tolerance limit by 1.5 dB
NOTE 2:
Power class 3 is the default power class unless otherwise stated

TABLE 6.2D.1-2

UL MIMO configuration in closed-loop spatial multiplexing scheme

| Transmission scheme | Number of layers | DCI format | TPMI index |
|---|---|---|---|
| Codebook based | 1 | DCI format 0_1 | 0.1 |
| Codebook based | 2 | DCI format 0_1 | 0 |

NOTE 1:
The UE is configured with one SRS resource with the parameter nrofSRS-Ports set to two SRS antenna ports.

When PUSCH is scheduled [for single-layer transmission] using TPMI 0 or 1 according to Table 6.2D.1-2, the output power shall be 3 dB less than the maximum output power given by Table 6.2D.1-1, as is specified in [8] subclause 7.1.

For each power class as indicated by the ue-PowerClass field of the UE-NR-Capability IE, the UE shall meet the requirements in 6.2.1 when PUSCH is scheduled for single antenna-port transmission by DCI 0_0 or by DCI 0_1 when the UE is configured for single port operation.

The behavour according to items 2 and 3 above are specified in the remaining subclauses of 6.2D, produced below:

6.2D.2 UE Maximum Output Power Reduction for UL MIMO

For UE with two transmit antenna connectors in closed-loop spatial multiplexing scheme, the allowed Maximum Power Reduction (MPR) for the maximum output power in Table 6.2D.1-1 is specified in Table 6.2.2-1 and Table 6.2.2-2 for the respective power class for both single-layer and dual layer transmission. The requirements shall be met with UL MIMO configurations specified in subclause 6.2D.1. For UEs indicating power class 3 in the ue-PowerClass field of the UE-NR-Capability IE and compliant with the requirements 6.2D.1-1 for power class 2 for dual-layer transmission, Table 6.2.2-2 may be used. The maximum output power is measured as the sum of the maximum output power at each UE antenna connector.

For the UE maximum output power modified by MPR, the power limits specified in subclause 6.2D.4 apply.

For each power class as indicated by the ue-PowerClass field of the UE-NR-Capability IE, the UE shall meet the requirements in 6.2.2 when PUSCH is scheduled for single antenna-port transmission by DCI 0_0 or by DCI 0_1 when the UE is configured for single port operation.

6.2D.3 UE Additional Maximum Output Power Reduction for UL MIMO

For UE with two transmit antenna connectors in closed-loop spatial multiplexing scheme, the A-MPR values specified in subclause 6.2.3 shall apply to the maximum output power specified in Table 6.2D.1-1 for both single-layer and dual-layer transmission. The requirements shall be met with the UL MIMO configurations specified in subclause 6.2D.1. For UEs indicating power class 3 in the ue-PowerClass field of the UE-NR-Capability IE and compliant with the requirements 6.2D.1-1 for power class 2 for dual-layer transmission shall meet the requirements 6.2.3 for power class 2. The maximum output power is measured as the sum of the maximum output power at each UE antenna connector. Unless stated otherwise, an A-MPR of 0 dB shall be used.

For the UE maximum output power modified by A-MPR, the power limits specified in subclause 6.2D.4 apply.

For each power class as indicated by the ue-PowerClass field of the UE-NR-Capability IE, the UE shall meet the requirements in 6.2.3 when PUSCH is scheduled for single antenna-port transmission by DCI 0_0 or by DCI 0_1 when the UE is configured for single port operation.

6.2D.4 Configured Transmitted Power for UL MIMO

The definitions of configured maximum output power $P_{CMAX,c}$, the lower bound $P_{CMAX\_L,c}$, and the higher bound $P_{CMAX\_H,c}$ specified in subclause 6.2.4 shall apply to UE supporting UL MIMO, where $P_{PowerClass}$, $\Delta P_{PowerClass}$ and $\Delta T_{C,c}$ are specified in subclause 6.2.4 unless otherwise stated;

$MPR_c$ is specified in subclause 6.2D.2;

$A\text{-}MPR_c$ is specified in subclause 6.2D.3.

For UEs indicating power class 3 in the ue-PowerClass field of the UE-NR-Capability IE and compliant with the requirements 6.2D.1-1 for power class 2 for dual-layer transmission, $\Delta P_{PowerClass} = -3$ dB for PUSCH transmissions with two layers.

The measured configured maximum output power $P_{UMAX,c}$ for serving cell c shall be within the following bounds:

$$P_{CMAX\_L,c} - \text{MAX}\{T_L, T_{LOW}(P_{CMAX\_L,c})\} \leq P_{UMAX,c} \leq P_{CMAX\_H,c} + T_{HIGH}(P_{CMAX\_H,c})$$

where $T_{LOW}(P_{CMAX\_L,c})$ and $T_{HIGH}(P_{CMAX\_H,c})$ are defined as the tolerance and applies to $P_{CMAX\_L,c}$ and $P_{CMAX\_H,c}$ Separately, while $T_L$ is the absolute value of the lower tolerance in Table 6.2D.1-1 for the applicable operating band. For single-laver transmissions on two antenna ports, the upper and lower bounds of the measured configured maximum output power $P_{UMAX,c}$ as specified above shall be reduced by 3 dB.

For UE with two transmit antenna connectors in closed-loop spatial amultiplexing scheme, the tolerance is specified in Table 6.2D.4-1. The requirements shall be met with UL MIMO configurations specified in subclause 6.2D.1.

TABLE 6.2D.4-1

P$_{CMAX, c}$ tolerance in closed-loop spatial multiplexing scheme

| P$_{CMAX, c}$ (dBm) | Tolerance T$_{LOW}$(P$_{CMAX\_L, c}$) (dB) | Tolerance T$_{HIGH}$(P$_{CMAX\_H, c}$) (dB) |
|---|---|---|
| P$_{CMAX, c}$ = 26 | 3.0 | 2.0 |
| 23 ≤ P$_{CMAX, c}$ < 26 | 3.0 | 2.0 |
| 22 ≤ P$_{CMAX, c}$ < 23 | 5.0 | 2.0 |
| 21 ≤ P$_{CMAX, c}$ < 22 | 5.0 | 3.0 |
| 20 ≤ P$_{CMAX, c}$ < 21 | 6.0 | 4.0 |
| 16 ≤ P$_{CMAX, c}$ < 20 | | 5.0 |
| 11 ≤ P$_{CMAX, c}$ < 16 | | 6.0 |
| −40 ≤ P$_{CMAX, c}$ < 11 | | 7.0 |

For each power class as indicated by the ue-PowerClass field of the UE-NR-Capability IE, the UE shall meet the requirements in 6.2.4 when PUSCH is scheduled for single antenna-port transmission by DCI 0_0 or by DCI 0_1 when the UE is configured for single port operation.

Changes to Clause 6.3D of 3GPP TS 38.101 according to some embodiments are produced below:

6.3D Output Power Dynamics for UL MIMO
6.3D.1 Minimum Output Power for UL MIMO

For UE with two transmit antenna connectors in closed-loop spatial multiplexing scheme, the minimum output power is defined as the sum of the mean power at each transmit connector in one sub-frame (1 ms). The minimum output power shall not exceed the values specified in Table 6.3.1-1.

The UE shall meet the requirements in 6.3.1 when PUSCH is scheduled for single antenna-port transmission by DCI 0_0 or by DCI 0_1 when the UE is configured for single port operation.

6.3D.2 Transmit OFF Power for UL MIMO

The transmit OFF power is defined as the mean power at each transmit antenna connector in a duration of at least one sub-frame (1 ms) excluding any transient periods.

The transmit OFF power at each transmit antenna connector shall not exceed the values specified in Table 6.3.2-1.

6.3D.3 Transmit ON/OFF Time Mask for UL MIMO

The ON/OFF time mask requirements in subclause 6.3.3 apply at each transmit antenna connector.

For UE with two transmit antenna connectors in closed-loop spatial multiplexing scheme, the general ON/OFF time mask requirements specified in subclause 6.3.3.1 apply to each transmit antenna connector. The requirements shall be met with the UL MIMO configurations described in subclause 6.2D.1.

The UE shall meet the requirements in 6.3.3 when PUSCH is scheduled for single antenna-port transmission by DCI 0_0 or by DCI 0_1 when the UE is configured for single port operation.

6.3D.4 Power Control for UL MIMO

The power control tolerance applies to the sum of output power at each transmit antenna connector.

The power control requirements specified in subclause 6.3.4 apply to UE with two transmit antenna connectors in closed-loop spatial multiplexing scheme. The requirements shall be met with UL MIMO configurations described in subclause 6.2D.1.

The UE shall meet the requirements in 6.3.4 when PUSCH is scheduled for single antenna-port transmission by DCI 0_0 or by DCI 0_1 when the UE is configured for single port operation.

Changes to Clause 6.4D of 3GPP TS 38.101 according to some embodiments are produced below:

6.4D Transmit Signal Quality for UL MIMO
6.4D.1 Frequency Error for UL MIMO

The basic measurement interval of modulated carrier frequency is 1 UL slot. The mean value of basic measurements of UE modulated carrier frequency at each transmit antenna connector shall be accurate to within ±0.1 PPM observed over a period of 1 ms of cumulated measurement intervals compared to the carrier frequency received from the NR Node B.

6.4D.2 Transmit Modulation Quality for UL MIMO

The transmit modulation quality requirements are specified at each transmit antenna connector.

The UE shall meet the requirements in 6.4.2 when PUSCH is scheduled for single antenna-port transmission by DCI 0_0 or by DCI 0_1 when the UE is configured for single port operation.

The transmit modulation quality is specified in terms of:
Error Vector Magnitude (EVM) for the allocated resource blocks (RBs)
EVM equalizer spectrum flatness derived from the equalizer coefficients generated by the EVM measurement process
Carrier leakage (caused by IQ offset)
In-band emissions for the non-allocated RB In case the parameter 3300 or 3301 is reported from UE via txDirectCurrentLocation IE (as defined in TS 38.331 [7]), carrier leakage measurement requirement in subclause 6.4D.2.2 and 6.4D.2.3 shall be waived, and the RF correction with regard to the carrier leakage and IQ image shall be omitted during the calculation of transmit modulation quality.

6.4D.2.1 Error Vector Magnitude

For UE with two transmit antenna connectors in closed-loop spatial multiplexing scheme, the Error Vector Magnitude requirements specified in Table 6.4.2.1-1 which is defined in subclause 6.4.2.1 apply at each transmit antenna connector. The requirements shall be met with the UL MIMO configurations specified in Table 6.2D.1-2

6.4D.2.2 Carrier Leakage

For UE with two transmit antenna connectors in closed-loop spatial multiplexing scheme, the Relative Carrier Leakage Power requirements specified in Table 6.4.2.2-1 which is defined in subclause 6.4.2.2 apply at each transmit antenna connector. The requirements shall be met with the UL MIMO configurations specified in Table 6.2D.1-2

6.4D.2.3 In-Band Emissions

For UE with two transmit antenna connectors in closed-loop spatial multiplexing scheme, the In-band Emission requirements specified in Table 6.4.2.3-1 which is defined in subclause 6.4.2.3 apply at each transmit antenna connector. The requirements shall be met with the uplink MIMO configurations specified in Table 6.2D.1-2

6.4D.2.4 EVM Equalizer Spectrum Flatness for UL MIMO

For UE with two transmit antenna connectors in closed-loop spatial multiplexing scheme, the EVM Equalizer Spectrum Flatness requirements specified in Table 6.4.2.4-1 and Table 6.4.2.4-2 which are defined in subclause 6.4.2.4 apply at each transmit antenna connector. The requirements shall be met with the UL MIMO configurations specified in Table 6.2D.1-2

6.4D.3 Time Alignment Error for UL MIMO

For UE(s) with multiple transmit antenna connectors supporting UL MIMO, this requirement applies to frame timing differences between transmissions on multiple transmit antenna connectors in the closed-loop spatial multiplexing scheme.

The time alignment error (TAE) is defined as the average frame timing difference between any two transmissions on different transmit antenna connectors.

For UE(s) with multiple transmit antenna connectors, the Time Alignment Error (TAE) shall not exceed 130 ns.

6.4D.4 Requirements for Coherent UL MIMO

For coherent UL MIMO, Table 6.4D.4-1 lists the maximum allowable difference between the measured relative power and phase errors between different antenna ports in any slot within the specified time window from the last transmitted SRS on the same antenna ports, for the purpose of uplink transmission (codebook or non-codebook usage) and those measured at that last SRS. The requirements in Table 6.4D.4-1 apply when the UL transmission power at each antenna port is larger than 0 dBm for SRS transmission and for the duration of time window.

TABLE 6.4D.4-1

Maximum allowable difference of relative phase and power errors in a given slot compared to those measured at last SRS transmitted

| Difference of relative phase error | Difference of relative power error | Time window |
| --- | --- | --- |
| 40 degrees | 4 dB | 20 msec |

The above requirements when all the following conditions are met within the specified time window:
- UE is not signaled with a change in number of SRS ports in SRS-config, or a change in PUSCH-config
- UE remains in DRX active time (UE does not enter DRX OFF time)
- No measurement gap occurs
- No instance of SRS transmission with the usage antenna switching occurs
- Active BWP remains the same
- EN-DC and CA configuration is not changed for the UE (UE is not configured or de-configured with PSCell or SCell(s))

Changes to Clause 6.5D of 3GPP TS 38.101 according to some embodiments are produced below:

6.5D Output RF Spectrum Emissions for UL MIMO 6.5D.1 Occupied Bandwidth for UL MIMO The requirements for occupied bandwidth apply to the transmitted spectrum as measured as the sum of the powers from all UE antenna connectors. The occupied bandwidth is defined as the bandwidth containing 99% of the total integrated mean power of the transmitted spectrum on the assigned channel at each transmit antenna connector.

For UE with two transmit antenna connectors in closed-loop spatial multiplexing scheme, the occupied bandwidth as measured as the sum of the powers from all UE antenna connectors shall be less than the channel bandwidth specified in table 6.5.1-1. The requirements shall be met with UL MIMO configurations described in subclause 6.2D.1.

The UE shall meet the requirements in 6.5.1 when PUSCH is scheduled for single antenna-port transmission by DCI 0_0 or by DCI 0_1 when the UE is configured for single port operation.

6.5D.2 Out of Band Emission for UL MIMO

The requirements for Out of band emissions resulting from the modulation process and non-linearity in the transmitters apply to the sum of the emissions from all UE antenna connectors.

For UEs with two transmit antenna connectors in closed-loop spatial multiplexing scheme, the requirements in subclause 6.5.2 apply to the sum of the emissions from all UE antenna connectors. The requirements shall be met with UL MIMO configurations described in subclause 6.2D.1.

The UE shall meet the requirements in 6.5.2 when PUSCH is scheduled for single antenna-port transmission by DCI 0_0 or by DCI 0_1 when the UE is configured for single port operation.

6.5D.3 Spurious Emission for UL MIMO

The requirements for Spurious emissions which are caused by unwanted transmitter effects such as harmonics emission, parasitic emissions, intermodulation products and frequency conversion products apply to the sum of the emissions from all UE antenna connectors.

For UEs with two transmit antenna connectors in closed-loop spatial multiplexing scheme, the requirements specified in subclause 6.5.3 apply to apply to the sum of the emissions from all UE antenna connectors. The requirements shall be met with the UL MIMO configurations described in subclause 6.2D.1.

The UE shall meet the requirements in 6.5.3 when PUSCH is scheduled for single antenna-port transmission by DCI 0_0 or by DCI 0_1 when the UE is configured for single port operation.

6.5D.4 Transmit Intermodulation for UL MIMO

The transmit intermodulation requirements are specified at each transmit antenna connector and the wanted signal is defined as the sum of output power at each transmit antenna connector.

For UEs with two transmit antenna connectors in closed-loop spatial multiplexing scheme, the requirements specified in subclause 6.5.4 apply to each transmit antenna connector. The requirements shall be met with the UL MIMO configurations described in subclause 6.2D.1.

The UE shall meet the requirements in 6.4.2 when PUSCH is scheduled for single antenna-port transmission by DCI 0_0 or by DCI 0_1 when the UE is configured for single port operation.

With continuing reference to the above changes to 3GPP TS 38.101, in some embodiments a UE implementing power class 2 with two power class 3 chains in UL-MIMO configuration is accommodated by allowing compliance with power class 2 requirements when the said UE transmits two layers also for a power class 3 indication in the field ue-PowerClass of its UE-NR-Capability. In fallback or single-port configuration this UE has to be compliant with power class 3, i.e. according to the capability indicated (a UE compliant with power class 2 under these conditions can indicate power class 2).

Furthermore, for a UE indicating power class 3 capability but compliant with power class 2 requirements for dual-layer transmission, the $P_{cmax}$ for PUSCH with dual antenna-ports configured is modified such that power class 2 behaviour is reported in the PHR (scaling applies across the port according to 38.213 to 23 dBm per port) in order to limit the ambiguity in signaling.

For EN-DC band combinations, the above UE would still indicate NR power class 3, the expected behaviour.

Clause 6.2.1: it is made clear that the UE shall meet the requirements for the power class indicated as stated explicity unless otherwise stated (for the exception for dual-layer transmission above).

The requirements on unwanted emissions are specified as the total of the emissions from UE antenna ports (connectors).

Figure 5:
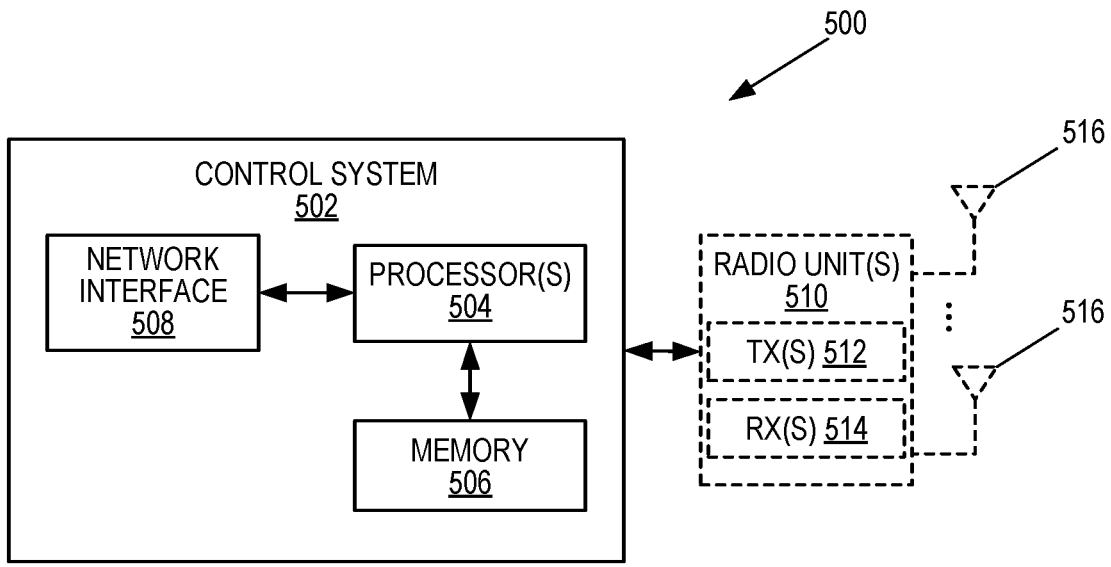
FIG. 5 is a schematic block diagram of a network node according to some embodiments of the present disclosure.

FIG. 5 is a schematic block diagram of a network node 500 according to some embodiments of the present disclosure. Optional features are represented by dashed boxes. The network node 500 may be, for example, a radio access node (e.g., a base station 402 or 406), a network node that implements all or part of the functionality of the radio access node described herein, or another network node. As illustrated, the network node 500 includes a control system 502 that includes one or more processors 504 (e.g., Central Processing Units (CPUs), Application Specific Integrated Circuits (ASICs), Field Programmable Gate Arrays (FPGAs), and/or the like), memory 506, and a network interface 508. The one or more processors 504 are also referred to herein as processing circuitry. In addition, the network node 500 may include one or more radio units 510 that each includes one or more transmitters 512 and one or more receivers 514 coupled to one or more antennas 516. The radio unit(s) 510 may be referred to or be part of radio interface circuitry. In some embodiments, the radio unit(s) 510 is external to the control system 502 and connected to the control system 502 via, e.g., a wired connection (e.g., an optical cable). However, in some other embodiments, the radio unit(s) 510 and potentially the antenna(s) 516 are integrated together with the control system 502. The one or more processors 504 operate to provide one or more functions of a network node 500 (e.g., a radio access node, such as a base station 402 or 406) as described herein. In some embodiments, the function(s) are implemented in software that is stored, e.g., in the memory 506 and executed by the one or more processors 504.

Figure 6:
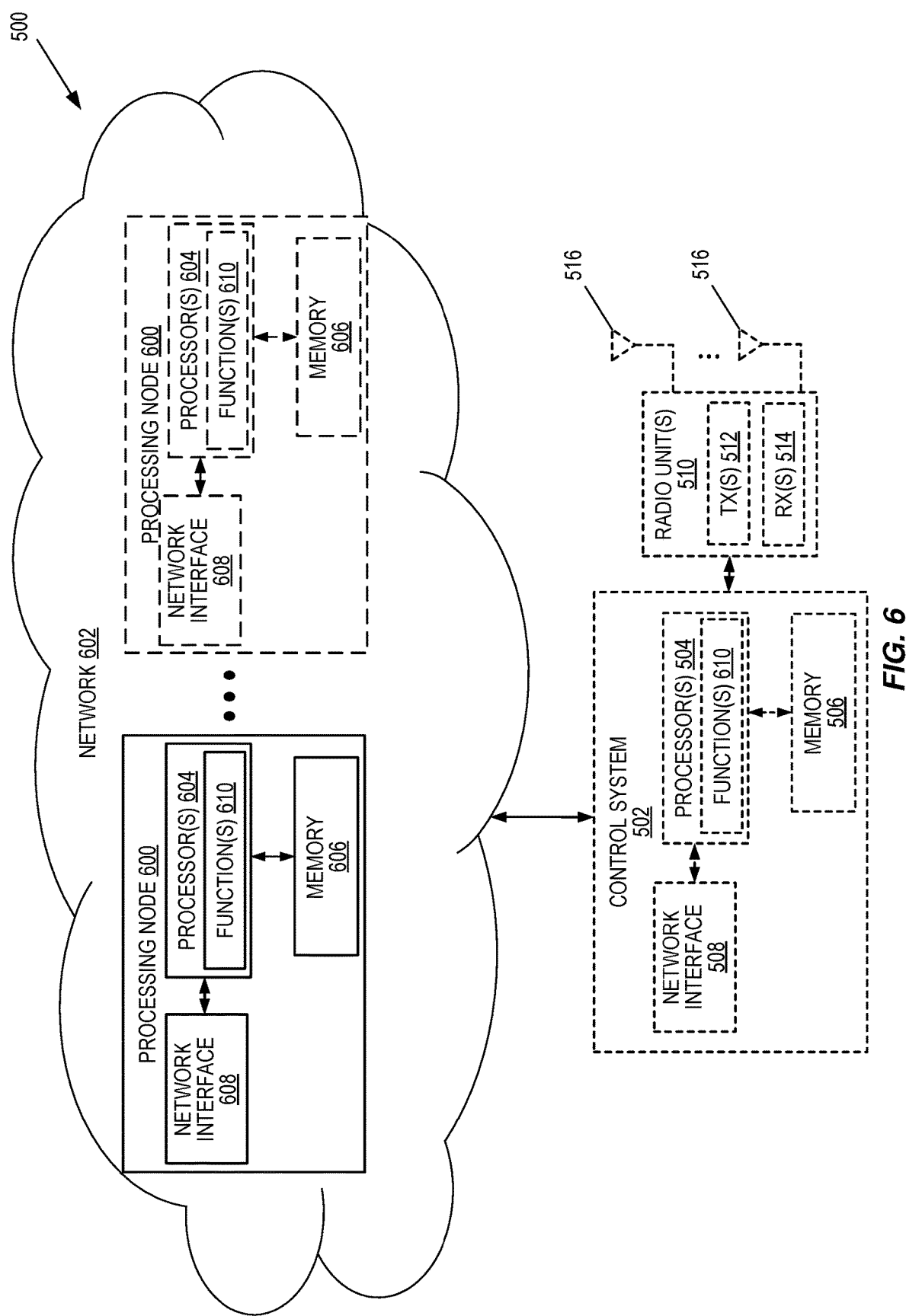
FIG. 6 is a schematic block diagram that illustrates a virtualized embodiment of the network node according to some embodiments of the present disclosure.

FIG. 6 is a schematic block diagram that illustrates a virtualized embodiment of the network node 500 according to some embodiments of the present disclosure. This discussion is equally applicable to other types of network nodes. Further, other types of network nodes may have similar virtualized architectures. Again, optional features are represented by dashed boxes.

As used herein, a "virtualized" network node is an implementation of the network node 500 in which at least a portion of the functionality of the network node 500 is implemented as a virtual component(s) (e.g., via a virtual machine(s) executing on a physical processing node(s) in a network(s)). As illustrated, in this example, the network node 500 may include the control system 502 and/or the one or more radio units 510, as described above. The control system 502 may be connected to the radio unit(s) 510 via, for example, an optical cable or the like. The network node 500 includes one or more processing nodes 600 coupled to or included as part of a network(s) 602. If present, the control system 502 or the radio unit(s) are connected to the processing node(s) 600 via the network 602. Each processing node 600 includes one or more processors 604 (e.g., CPUs, ASICs, FPGAs, and/or the like), memory 606, and a network interface 608.

In this example, functions 610 of the network node 500 described herein are implemented at the one or more processing nodes 600 or distributed across the one or more processing nodes 600 and the control system 502 and/or the radio unit(s) 510 in any desired manner. In some particular embodiments, some or all of the functions 610 of the network node 500 described herein are implemented as virtual components executed by one or more virtual machines implemented in a virtual environment(s) hosted by the processing node(s) 600. As will be appreciated by one of ordinary skill in the art, additional signaling or communication between the processing node(s) 600 and the control system 502 is used in order to carry out at least some of the desired functions 610. Notably, in some embodiments, the control system 502 may not be included, in which case the radio unit(s) 510 communicate directly with the processing node(s) 600 via an appropriate network interface(s).

In some embodiments, a computer program including instructions which, when executed by at least one processor, causes the at least one processor to carry out the functionality of the network node 500 or a node (e.g., a processing node 600) implementing one or more of the functions 610 of the network node 500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 7:
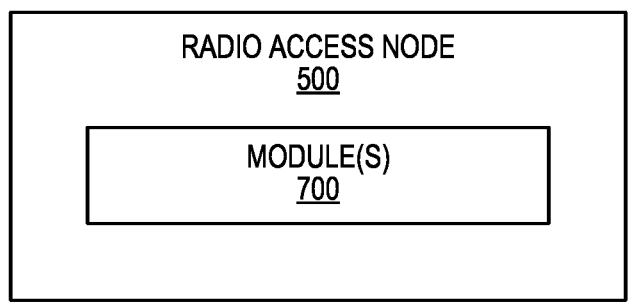
FIG. 7 is a schematic block diagram of the network node according to some other embodiments of the present disclosure.

FIG. 7 is a schematic block diagram of the network node 500 according to some other embodiments of the present disclosure. The network node 500 includes one or more modules 700, each of which is implemented in software. The module(s) 700 provide the functionality of the network node 500 described herein. This discussion is equally applicable to the processing node 600 of FIG. 6 where the modules 700 may be implemented at one of the processing nodes 600 or distributed across multiple processing nodes 600 and/or distributed across the processing node(s) 600 and the control system 502.

Figure 8:
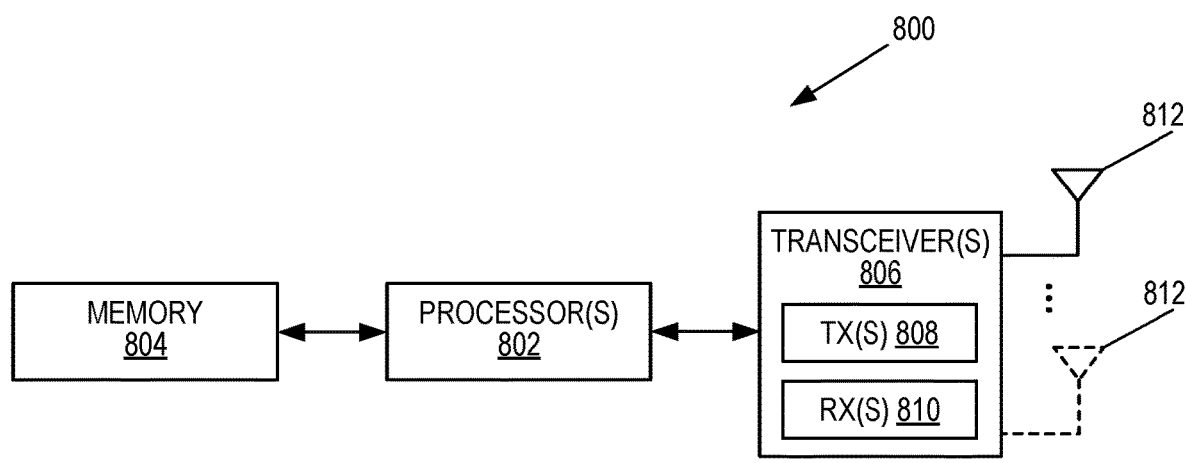
FIG. 8 is a schematic block diagram of a wireless communication device according to some embodiments of the present disclosure.

FIG. 8 is a schematic block diagram of a wireless communication device 800 according to some embodiments of the present disclosure. As illustrated, the wireless communication device 800 includes one or more processors 802 (e.g., CPUs, ASICs, FPGAs, and/or the like), memory 804, and one or more transceivers 806 each including one or more transmitters 808 and one or more receivers 810 coupled to one or more antennas 812. The transceiver(s) 806 includes radio front-end circuitry connected to the antenna(s) 812 that is configured to condition signals communicated between the antenna(s) 812 and the processor(s) 802, as will be appreciated by on of ordinary skill in the art. The processors 802 are also referred to herein as processing circuitry. The transceivers 806 are also referred to herein as radio circuitry. In some embodiments, the functionality of the wireless communication device 800 described above may be fully or partially implemented in software that is, e.g., stored in the memory 804 and executed by the processor(s) 802. Note that the wireless communication device 800 may include additional components not illustrated in FIG. 8 such as, e.g., one or more user interface components (e.g., an input/output interface including a display, buttons, a touch screen, a microphone, a speaker(s), and/or the like and/or any other components for allowing input of information into the wireless communication device 800 and/or allowing output of information from the wireless communication device 800), a power supply (e.g., a battery and associated power circuitry), etc.

In some embodiments, a computer program including instructions which, when executed by at least one processor, causes the at least one processor to carry out the functionality of the wireless communication device 800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
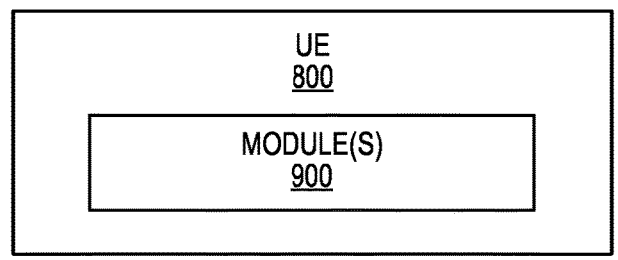
FIG. 9 is a schematic block diagram of the wireless communication device according to some other embodiments of the present disclosure.

FIG. 9 is a schematic block diagram of the wireless communication device 800 according to some other embodiments of the present disclosure. The wireless communication device 800 includes one or more modules 900, each of which is implemented in software. The module(s) 900 provide the functionality of the wireless communication device 800 described herein.

Figure 10:
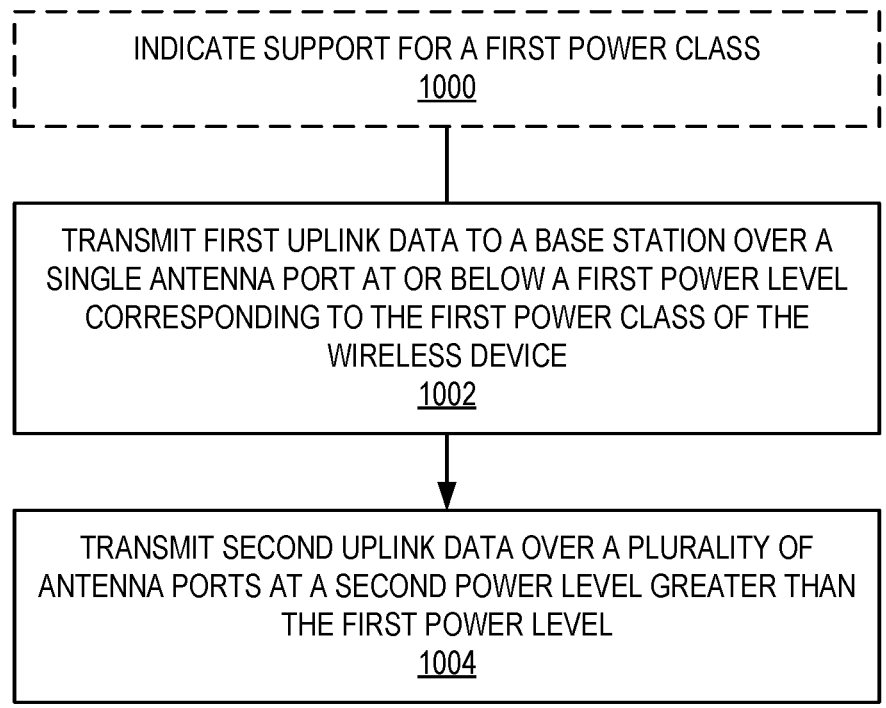
FIG. 10 is a flowchart illustrating a method for delivering increased transmission power.

FIG. 10 is a flowchart illustrating a method for delivering increased transmission power. The method may be performed by a wireless device (e.g., a UE) which can transmit over one or multiple antenna ports. The method may optionally begin with step 1000, with indicating support for a first power class. The first power class can correspond to a first power level, and may further identify a maximum amount of power a UE can transmit. In some examples, step 1000 further includes indicating support for a second power class. The method continues at step 1002, with transmitting first UL data to a network node (e.g., a base station) over a single antenna port at or below the first power level corresponding to the first power class of the wireless device. In some examples, this transmission is over a single layer PUSCH at a power that is at most the first power level (e.g., the maximum amount of power a UE can transmit). The method continues at step 1004, with transmitting second UL data over a plurality of antenna ports at a second power level greater than the first power level. In some examples, this transmission is over an N-layer PUSCH on N antenna ports (where N is at least 2) at a second power that is at most the second power level (which may correspond to a maximum power level of the second power class).

Figure 11:
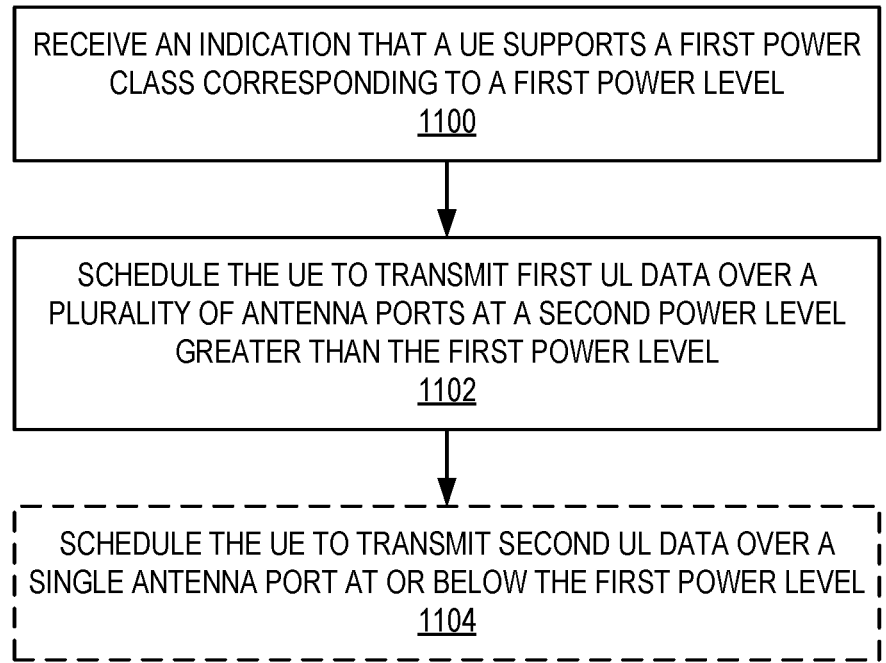
FIG. 11 is a flowchart illustrating a method for supporting an extended power class.

FIG. 11 is a flowchart illustrating a method for supporting an extended power class. The method may be performed by a network node (e.g., a radio access node). The method begins with step 1100, with receiving an indication that a UE (e.g., a wireless device) supports a first power class corresponding to a first power level. The first power level may identify a maximum amount of power at which a UE can transmit. In some examples, step 1100 further includes receiving another indication that the UE supports a second power class (which may correspond to a second power level). The method continues at step 1102, with scheduling the UE to transmit first UL data over a plurality of antenna ports at the second power level greater than the first power level. In some examples, this transmission is over an N-layer PUSCH on N antenna ports (where N is at least 2) at a second power that is at most the second power level (which may correspond to a maximum power level of the second power class). The method may optionally continue at step 1104, with scheduling the UE to transmit second UL data over a single antenna port at or below the first power level. In some examples, this transmission is scheduled over a single layer PUSCH at a power that is at most the first power level (e.g., the maximum amount of power a UE can transmit).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Group A Embodiments

Embodiment 1: A method performed by a wireless device for delivering increased transmission power, the method comprising: transmitting first UL data to a base station over an antenna port at a first power level corresponding to a first power class of the wireless device; and transmitting second UL data over a plurality of antenna ports at a second power level greater than the first power level.

Embodiment 2: The method of embodiment 1, further comprising reporting support for the first power class to the base station prior to transmitting the first UL data.

Embodiment 3: The method of any of embodiments 1 to 2, wherein the first power class identifies a maximum amount of transmission power for a UE in communication with the base station.

Embodiment 4: The method of any of embodiments 1 to 3, wherein the first UL data is transmitted over a single layer PUSCH.

Embodiment 5: The method of any of embodiments 1 to 4, wherein the second UL data is transmitted over an N-layer PUSCH via N antenna ports.

Embodiment 6: The method of any of embodiments 1 to 5, wherein the second power level is a function of a configured maximum output power corresponding to the first power class and N.

Embodiment 7: The method of embodiment 6, further comprising reporting a power headroom calculated according to the second power level to the base station.

Embodiment 8: The method of any of embodiments 1 to 7, wherein: the wireless device is configured with N SRS ports; and the second power level is N times the first power level.

Embodiment 9: The method of embodiment 8, wherein the first UL data is transmitted in response to a DCI format 0_0.

Embodiment 10: The method of any of embodiments 1 to 9, wherein the second power level corresponds to a second power class.

Embodiment 11: The method of embodiment 10, further comprising reporting support for the first power class and the second power class to the base station prior to transmitting the first UL data and prior to transmitting the second UL data.

Embodiment 12: A method in a UE of delivering increased transmission power, wherein the UE can transmit on multiple antenna ports and at a second power level, the method comprising: indicating support for a first power class, wherein: the first power class corresponds to a first power level; the first power level is less than the second power level; and the first power class identifies a maximum amount of power a UE can transmit; transmitting a single layer PUSCH on one antenna port at a power that is at most the first power level; and transmitting an N-layer PUSCH on N antenna ports at a second power that is at most the second power level, where N is at least 2.

Embodiment 13: The method of embodiment 12, wherein: a configured maximum output power corresponding to the first power class is multiplied by a factor of N to form the second power level, and the method further comprises reporting a power headroom calculated according to the second power level.

Embodiment 14: The method of any of embodiments 12 to 13, wherein the UE is configured to transmit one antenna port for PUSCH.

Embodiment 15: The method of and of embodiments 12 to 13, wherein: the UE is configured with N SRS ports and transmits the single layer PUSCH in response to DCI format 0_0; and the second power level is N times as large as the first power level of the first power class.

Embodiment 16: The method of any of embodiments 12 to 15, further comprising indicating support for both the first power class and the second power level.

Embodiment 17: The method of any of embodiments 12 to 13, wherein the second power level corresponds to a second power class.

Group B Embodiments

Embodiment 18: A wireless device for delivering increased transmission power, the wireless device comprising: processing circuitry configured to perform any of the steps of any of the Group A embodiments; and power supply circuitry configured to supply power to the wireless device.

Embodiment 19: A UE for delivering increased transmission power, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 20: A UE configured to communicate with a base station, the UE comprising a radio interface and processing circuitry configured to perform the method of the previous 3 embodiments.

Embodiment 21: A communication system including a host computer comprising: processing circuitry configured to provide user data; and a communication interface configured to forward user data to a cellular network for transmission to a UE; wherein the UE comprises a radio interface and processing circuitry, the UE's components configured to perform any of the steps of any of the Group A embodiments.

Embodiment 22: The communication system of the previous embodiment, wherein the cellular network further includes a base station configured to communicate with the UE.

Embodiment 23: A communication system including a host computer comprising: communication interface configured to receive user data originating from a transmission from a UE to a base station; wherein the UE comprises a radio interface and processing circuitry, the UE's processing circuitry configured to perform any of the steps of any of the Group A embodiments.

Embodiment 24: The communication system of the previous embodiment, further including the UE.

Embodiment 25: The communication system of the previous 2 embodiments, further including the base station, wherein the base station comprises a radio interface configured to communicate with the UE and a communication interface configured to forward to the host computer the user data carried by a transmission from the UE to the base station.

Embodiment 26: A method implemented in a communication system including a host computer, a base station, and a UE, the method comprising: at the host computer, receiving user data transmitted to the base station from the UE, wherein the UE performs any of the steps of any of the Group A embodiments.

Embodiment 27: The method of the previous embodiment, further comprising, at the UE, providing the user data to the base station.

Embodiment 28: A method implemented in a communication system including a host computer, a base station, and a UE, the method comprising: at the host computer, receiving, from the base station, user data originating from a transmission which the base station has received from the UE, wherein the UE performs any of the steps of any of the Group A embodiments.

Embodiment 29: The method of the previous embodiment, further comprising at the base station, receiving the user data from the UE.

Embodiment 30: The method of the previous 2 embodiments, further comprising at the base station, initiating a transmission of the received user data to the host computer.

Those skilled in the art will recognize improvements and modifications to the embodiments of the present disclosure. All such improvements and modifications are considered within the scope of the concepts disclosed herein.

What is claimed is:

1. A method performed by a wireless device for delivering increased transmission power, the method comprising:
    transmitting first uplink (UL) data to a network node over a single antenna port at or below a first power level corresponding to a first power class of the wireless device; and
    transmitting second UL data over a plurality of antenna ports at a second power level greater than the first power level, wherein the second power level corresponds to a second power class.

2. The method of claim 1, further comprising reporting support for the first power class to the network node prior to transmitting the first UL data.

3. The method of claim 1, wherein the first power class identifies the first power level as a maximum amount of transmission power for communication with the network node.

4. The method of claim 1, wherein the first UL data is transmitted over a single layer Physical UL Shared Channel (PUSCH).

5. The method of claim 1, wherein the second UL data is transmitted over an N-layer Physical UL Shared Channel (PUSCH) via N antenna ports.

6. The method of claim 5, wherein the second power level is a function of a configured maximum output power corresponding to the first power class and N.

7. The method of claim 6, further comprising reporting a power headroom calculated according to the second power level to the network node.

8. The method of claim 1, wherein:
the wireless device is configured with N Sounding Reference Signal (SRS) ports; and
the second power level is N times the first power level.

9. The method of claim 8, wherein the first UL data is transmitted in response to being scheduled by Downlink Control Information (DCI) format 0_0.

10. The method of claim 8, wherein the second UL data is transmitted in response to being scheduled by Downlink Control Information (DCI) format 0_1.

11. The method of claim 1, further comprising reporting support for the first power class and the second power class to the network node prior to transmitting the first UL data and prior to transmitting the second UL data.

12. A method in a User Equipment (UE) of delivering increased transmission power, wherein the UE can transmit on multiple antenna ports and at a total second power level, the method comprising:
indicating support for a first power class, wherein:
the first power class corresponds to a first power level;
the first power level is less than the second power level; and
the first power class identifies a maximum amount of power one single antenna port of the UE transmits;
transmitting a single layer Physical Uplink Shared Channel (PUSCH) on one antenna port at a power that is at most the first power level; and
transmitting an N-layer PUSCH on N antenna ports at a second power that is at most the second power level, where N is at least 2, wherein the second power level corresponds to a second power class.

13. The method of claim 12, wherein:
a configured maximum output power corresponding to the first power class is multiplied by a factor of N to form the second power level, and
the method further comprises reporting a power headroom calculated according to the second power level.

14. The method of claim 12, wherein the UE is configured to transmit over one antenna port for PUSCH.

15. The method of claim 12, wherein:
the UE is configured with N Sounding Reference Signal (SRS) ports and transmits the single layer PUSCH in response to Downlink Control Information (DCI) format 0_0; and
the second power level is N times as large as the first power level of the first power class.

16. The method of claim 12, further comprising indicating support for both the first power class and the second power level.

17. A method performed by a network node for supporting an extended power class, the method comprising:
receiving an indication that a User Equipment (UE) supports a first power class corresponding to a first power level; and
scheduling the UE to transmit first Uplink (UL) data over a plurality of antenna ports at a total second power level greater than the first power level, wherein the total second power level corresponds to a second power class.

18. The method of claim 17, wherein the first power class identifies the first power level as a maximum amount of transmission power for transmissions by the UE.

* * * * *